June 19, 1945.  T. O. BROWN  2,378,381
PITCH CONTROL FOR HELICOPTER BLADES
Filed June 1, 1944  2 Sheets-Sheet 1
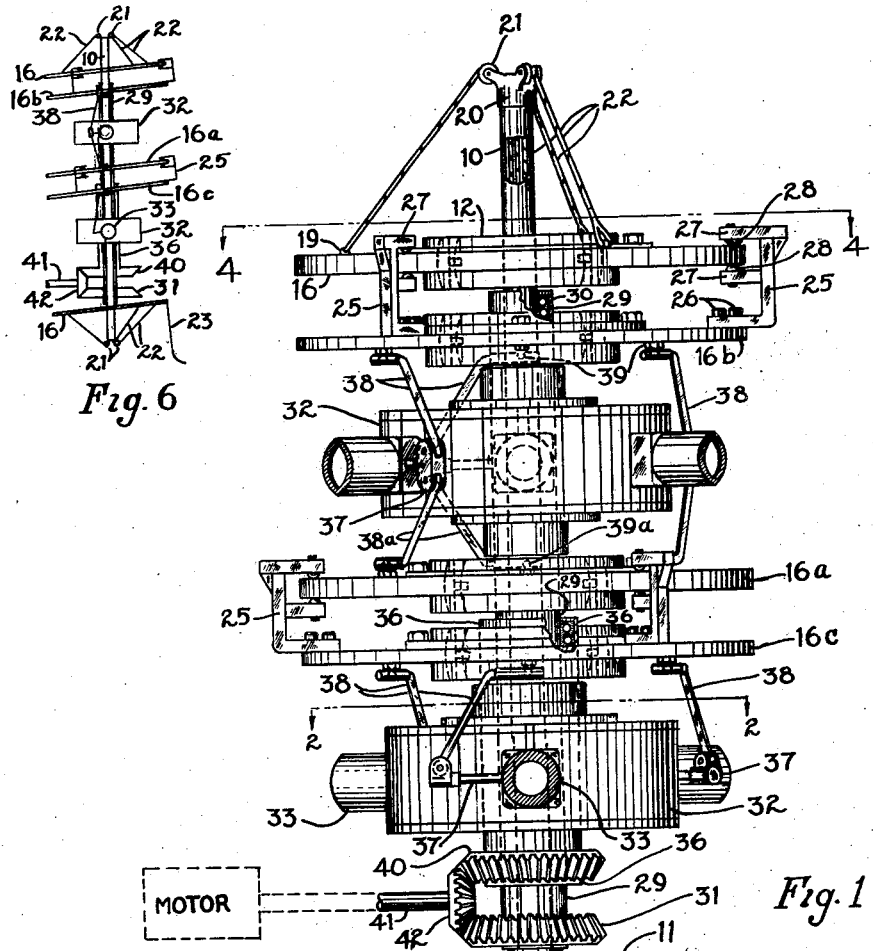
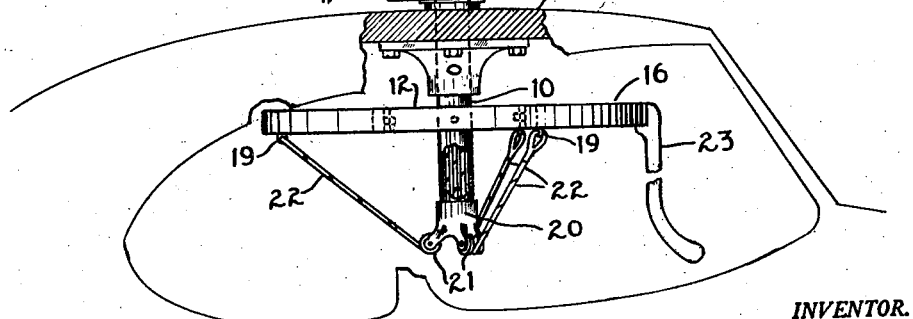
INVENTOR.
TERRILL O. BROWN
BY
Martin E. Anderson June 19, 1945.　　　　T. O. BROWN　　　　2,378,381

PITCH CONTROL FOR HELICOPTER BLADES

Filed June 1, 1944　　　　2 Sheets-Sheet 2

INVENTOR.
TERRILL O. BROWN
BY
Martin E. Anderson

Patented June 19, 1945

2,378,381

UNITED STATES PATENT OFFICE 2,378,381

PITCH CONTROL FOR HELICOPTER BLADES

Terrill O. Brown, Colorado Springs, Colo., assignor of ninety-five per cent to Aircraft Mechanics, Inc., Colorado Springs, Colo., a corporation of Colorado Application June 1, 1944, Serial No. 538,261

4 Claims. (Cl. 244—17)

This invention relates to improvements in aircraft and has reference more particularly to aircraft of the rotary wing type in which the airscrew provides the sustaining and also the propelling force.

It is the object of this invention to produce a helicopter which shall be capable of flight in a vertical or in a horizontal direction and in which the direction of horizontal movement can be controlled by the pilot and in which the speed in a horizontal direction can also be varied.

The lifting and propelling screws of helicopters must, of necessity, be provided with means for regulating the pitch so as to obtain the desired lifting force and at the same time the pitch of the blades must be varied during each rotary motion so as to produce a feathering which results in a horizontal force that propels the aircraft in the desired direction.

It is the object of this invention to produce a construction by means of which the pitch of the blades can be varied and in which the degree and direction of the feathering can be controlled by the operator.

When an aircraft of the helicopter type is moving in a horizontal direction, it is evident that the blades in that portion of their rotary movement in which they are moving against the air currents will have a greater relative air and blade speed than when they are moving rearwardly. Since the blades are also to produce the propelling force, it is evident that the axis of rotation must either be inclined in the direction of movement or that the blades must be subjected to a feathering action which increases the pitch on the rearward stroke so as to not only neutralize the retarding forces acting on the blades during the advancing part of the stroke, but be greater so as to produce a propelling force tending to move the aircraft in the desired direction.

Helicopters are provided either with a single lifting and propelling screw, or more often with two. Where a single screw is used forces are set up that tend to turn the aircraft about the axis of the propeller and such forces must be resisted by suitable means. Where two lifting screws, rotating in opposite directions, are employed, the torque forces neutralize each other, thereby obviating the necessity of providing means for resisting such torque forces.

The present invention relates to a mechanism employing two lifting screws operating in opposite directions about the same axis and relates more particularly to the means employed for varying the blade pitch at different parts of their rotary orbits so as to obtain the desired feathering for the purpose of developing a propulsive force.

Having thus, in a general way, set out the objects of the invention, the construction by means of which these objects are obtained will now be described in detail, and for this purpose reference will be had to the accompanying drawings in which the invention has been illustrated in its preferred form, and in which:

Figure 1 is a side elevation of the improved mechanism, portions being broken away to better disclose the construction;

Figure 6 is a diagram showing in a simplified manner the relative position of the various parts.

Figure 4:
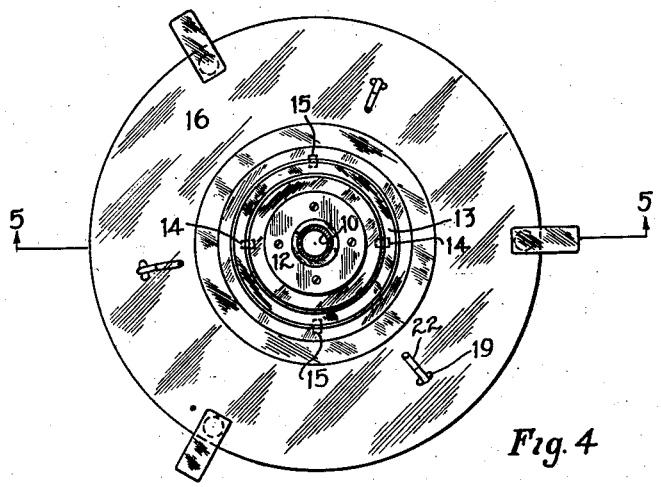
Figure 4 is a section taken on line 4—4, Figure 1.

In the drawings reference numeral 10 designates a tubular bearing which has been shown as rigidly secured to the nacelle 11 of an aircraft. At this time it will be pointed out that the outline of the aircraft nacelle has merely been indicated in a more or less diagrammatic manner for the purpose of facilitating the description and it is to be understood that the specific relationship of the parts of the mechanism comprising the invention to the nacelle shown is not to be considered as illustrating the actual construction.

Figure 5:
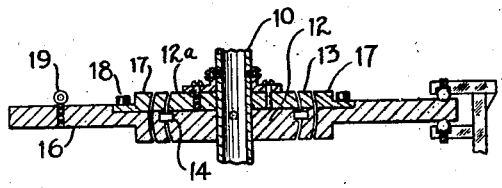
Figure 5 is a transverse section taken on line 5—5, Figure 4.

Secured to the tubular bearing are hubs 12, each of which is surrounded by a gimbal ring 13 that is connected with the hub by means of pivot pins 14 positioned at diametrically opposed points. Pivot pins 15 extend radially from the gimbal ring at diametrically opposed points spaced ninety degrees from pivots 14. Surrounding the gimbal ring is a circular plate 16 having an opening of sufficient diameter to receive the gimbal ring. An annular section 17 surrounds the opening in plate 16 and is held in place by means of screws 18 as shown more particularly in Figure 5. The hub 12 is composed of two parts one of which has been designated by reference numeral 12a in Figure 5. The reason for the parts 17 and 12a is that the inner and outer surfaces of the gimbal ring are spherical and since a close fit is desired, it is necessary to make the plates as shown. At points spaced 120 degrees apart, are eye-bolts 19 whose purpose will hereinafter appear. At the top and the bottom of the tubular bearing are steel terminal caps 20, each of which has three grooved rollers or pulleys 21, spaced 120 degrees apart. Steel cables 22 extend through the tubular bearing and have their ends connected to the eye-bolts 19 as shown. The plate 16, at the lower end, is provided with a handle 23 that extends downwardly and terminates in a hand grip 24. It will now be evident that, if the cables are of equal lengths, the two plates 16 will be held in parallel relation and that the angular relation of those plates to the tubular bearing 10, can be altered by the operator whenever he desires to do so, as it is possible by means of the handle 23 to tilt the lower plate 16 about its gimbal connection with the tubular bearing and thus impart a similar and simultaneous tilting motion to the upper plate 16.

Figure 2:
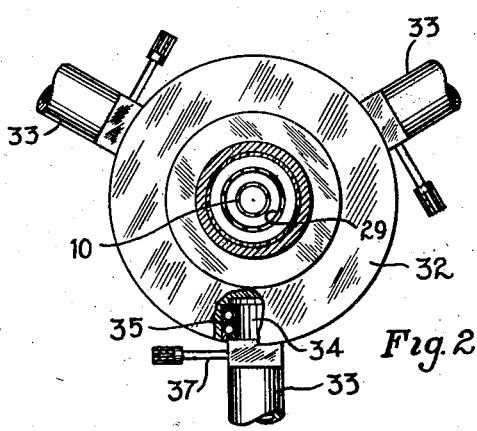
Figure 2 is a section taken on line 2—2, Figure 1.
Figure 3:
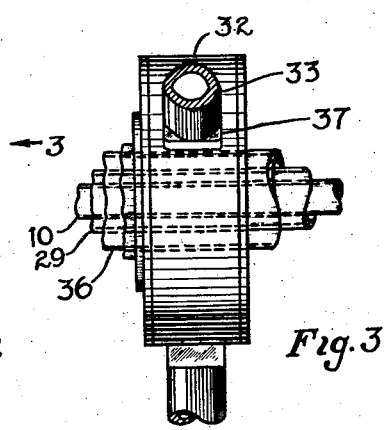
Figure 3 is a side elevation of that portion shown in Figure 2, looking in the direction of arrow 3.
Figure 7:
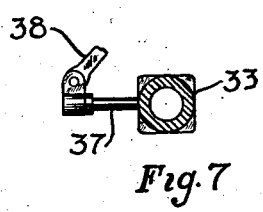
Fig. 7 is a detail view showing the connection between a pitch control crank arm and its associated propeller blade.

Positioned directly beneath the upper plate 16 is another assembly that is constructed in the same manner. The plate corresponding to plate 16, has been designated by reference numeral 16b to distinguish it from the other two. Secured to plate 16b are three upwardly extending brackets 25 that are rigidly secured to the upper surface of plate 16b by screws 26, or other suitable means. Brackets 25 are made integral and are each provided with two inwardly extending fingers 27 that span the plate 16. Rollers 28 are carried by each finger 27 and engage the opposite surfaces of the plate. The assembly comprising the plate 16b is secured to a tubular shaft 29 that is mounted for rotation on the tubular bearing 10 and separated from the latter by suitable antifriction bearings 30, one of which is located at the top and the other at the bottom. The bearing at the bottom has not been shown. A bevel gear 31 is nonrotatably secured to the lower end of shaft 29 as shown in Figure 1. Connected with and nonrotatably secured to shaft 29 is a hub 32 whose construction has been shown in Figures 2 and 3. Extending radially from the hub are three propeller blades that have been indicated by reference numerals 33. The root portion of one of these blades has been shown through a broken part of the hub and has been indicated by reference numeral 34. Suitable antifriction bearings, which have been designated in a general way by the one indicated by reference numeral 35, secures the blades to the hub in such a way that they may rotate about their axes and at the same time resist the strong centrifugal forces that tend to move them outwardly. It will be pointed out here that the construction shown in Figure 2 is merely illustrative of means for securing the propeller blades to the hub and that it can be replaced by any other suitable bearing. The hub shown in Figures 2 and 3 is not secured to shaft 29, but to a second tubular shaft which has been designated by reference numeral 36. Aside from the size of the opening, these two hubs are identical. Each of the propeller blades is provided with a crank arm 37 and this is connected by means of a rod 38 with the underside of plate 16b by means of a ball and socket joint 39. It will now be apparent that if plate 16b and hub 32 rotate relative to the plate 16, the pitch of the blades will be varied in accordance with the angular relation between the tubular bearing 10 and plate 16. Whenever plate 16 is in a plane perpendicular to the axis of bearing 10, the blade pitch remains the same throughout the entire orbit, but if plate 16 is tilted, it will impart to the propeller blades a pitch variation corresponding to the direction and extent of the angular relation between the plate 16 and bearing 10, and this can be controlled by the operator through lever 23 and associate parts. Where, as in this case, two propellers are mounted for rotation about the same axis and in opposite directions so as to neutralize the torque forces, a second tubular shaft 36 is rotatably connected with shaft 29 by means of suitable antifriction bearings at the top and at the bottom. A tiltable plate 16a is connected with shaft 29 in the same manner as plate 16 is connected with shaft 10. A plate 16c is connected with the upper end of shaft 36 by a gimbal joint like that shown in Figures 4 and 5 and above described.

Connecting rods 38a extend from the crank arms 37 downwardly and are connected with the upper surface of plate 16a by means of a ball and socket joint 39a. There are, of course, three connecting rods 38, one for each of the propellers and therefore whenever plate 16 is tilted relative to the axis of bearing 10, it will impart a corresponding tilting movement to plate 16a.

Plate 16a is interconnected with plate 16c by means of brackets 25 like those shown at the top of the finger. This interconnection maintains plate 16a and 16c parallel. Secured to shaft 36, at a point below plate 16c is a hub 32 that is identical in construction with the one already described with the exception that the opening at the center is large enough to receive shaft 36. The propellers are connected with plate 16c in the same manner as above described in connection with the upper hub and plate 16b. The lower end of shaft 36 is provided with a bevel gear 40 and the lower end of shaft 29 with a bevel gear 31. Power from a suitable engine is transmitted to the two gears 31 and 40 by means of a shaft 41 that carries a pinion 42 that is in operative engagement with both of the bevel gears 31 and 40 and which therefore imparts to shafts 29 and 36 rotary motion in opposite directions and at the same speed. The gears may be positioned in any suitable place and if positioned at the top of the nacelle they are enclosed in a suitable housing.

In the drawings the mechanism shown has been described as having a vertical position relative to the nacelle and has not been provided with any means for tilting the assembly. It is quite common practice in connection with helicopter construction to provide means for tilting the axis of the propeller assembly in a plane parallel with the direction of motion as by this means the lifting force of propellers operating at a constant pitch angle for the entire revolution can be resolved into a lifting and a propelling force.

In this construction the propelling force is obtained by means of the variation in the pitch angles at different parts of the propeller blade revolution. When the blades move forwardly, the angle is such as to afford the desired lifting force, but after the blade has passed through the forward point and starts on its rearward stroke, the pitch angle is increased and therefore acts as a paddle for producing a propelling force. By changing the points at which the blade angles move from a lifting to a propelling pitch, the direction of the propelling force can be determined and in this way the direction in which the aircraft travels can be controlled.

Since the invention relates more particularly to the mechanism illustrated, no attempt will be here made to explain in detail the operation of helicopter types of aircraft as such crafts and their mode of operation are well known.

Having described the invention what is claimed as new is:

1. In an aircraft of the rotary wing type, the combination which comprises an upwardly ranging, elongated tubular bearing, at least three pulleys positioned at each end, a plate adjacent each end of the bearing, mounted on the bearing for universal tilting movement, flexible and substantially inextensible tension members of equal length passing through the tubular bearing and about the pulleys, the ends of the tension members being attached to the plates at correspondingly positioned, angularly spaced points, whereby the two plates will be held in parallel relation and constrained to move simultaneously.

2. In an aircraft of the rotary wing type the combination which comprises an upwardly ranging, elongated tubular bearing, at least three pulleys attached to each end thereof, a plate adjacent each end of the bearing, mounted thereon for universal tilting movement, flexible and substantially inextensible tension members of equal length passing through the tubular bearing and about the pulleys, the ends of the tension members being attached to the plates at correspondingly positioned angularly spaced points, whereby the two plates will be held in parallel relation and constrained to move simultaneously, a tubular shaft rotatably mounted on the tubular bearing, between the two tiltable plates, a plate nonrotatably secured to the tubular shaft adjacent its upper end, said last named plate being mounted for universal tilting movement, means for constraining the plate on the tubular bearing and the upper plate on the tubular shaft to remain in parallel relation in all relative rotary positions of the tubular shaft and the tubular bearing, a hub nonrotatably secured to the tubular shaft beneath the last named plate, at least two propeller blades extending radially from the hub and mounted for limited rotary movement about their longitudinal axes, and means responsive to the angular tilting movement of the plates for imparting to the blades a corresponding rotary movement about their longitudinal axes when the tubular shaft is turned relative to the tubular bearing.

3. A device for use in an aircraft of the rotary wing type which comprises an upwardly ranging, elongated tubular bearing, a plate adjacent each end of the bearing mounted thereon for universal movement, means interconnecting the plates to constrain them to move simultaneously and maintain them parallel, a tubular shaft rotatably mounted on the bearing between the two tiltable plates, a plate nonrotatably secured to the tubular shaft adjacent its upper end, said last named plate being mounted for universal tilting movement, means interconnecting the upper plate on the bearing with the plate on the tubular shaft to constrain the plates to remain in parallel relation in all relative rotary positions of the tubular shaft and the tubular bearing, a hub nonrotatably secured to the tubular shaft below the tiltable plate that is secured thereto, at least two blades extending radially from the hub, and means for turning the blades about their longitudinal axes an angular distance proportional to the corresponding angular movement between the tiltable plates and the axis of the shaft, when the tubular shaft rotates on the tubular bearing.

4. In an aircraft of the rotary wing type, the combination comprising an upwardly ranging, elongated tubular bearing having at least three pulleys positioned at each end, a plate adjacent each end of the bearing and mounted thereon for universal movement, flexible and substantially inextensible tension members of equal length passing through the tubular bearing and about the pulleys, the ends of the tension members being attached to the plates at correspondingly positioned angularly spaced points whereby the two plates will be held in parallel relation and constrained to move simultaneously, a tubular shaft rotatably mounted on the bearing between the plates with its upper end adjacent the upper plate, a tiltable plate nonrotatably secured to the tubular shaft adjacent its upper end, said last named plate being mounted for universal movement, means for maintaining the three plates in parallel relation in all rotary positions of the tubular shaft, a hub non-rotatably secured to the tubular shaft below the tiltable plate thereon, at least two blades extending radially from the hub, means for turning the blades about their longitudinal axes an angular distance proportional to the corresponding angular change between the tiltable plates and the axis of the tubular shaft when the plates are tilted and the tubular shaft rotated relative to the tubular bearing, a tiltable plate secured to the tubular shaft below the hub, means interconnecting the tiltable plates on the tubular shaft on opposite sides of the hub to maintain them parallel, a tubular shaft encircling and rotatably mounted on the first mentioned tubular shaft, below the last mentioned tiltable plate, a tiltable plate nonrotatably secured to the upper end of the second tubular shaft for universal movement, means interconnecting the lower tiltable plate on the first mentioned tubular shaft with the tiltable plate on the second mentioned tubular shaft for maintaining them parallel in all relative rotary positions, a hub nonrotatably secured to the second tubular shaft at a point below the last mentioned tiltable plate, at least two blades extending radially from the last named hub, said blades being mounted for limited rotary movement about their longitudinal axes, and means interconnecting the blades on the last named hub with the tiltable plate at the upper end of the second rotary shaft, for turning the blades about their axes through angles corresponding to changes in the angular inclination of the tiltable plates, when the tubular shafts rotate relative to each other.

TERRILL O. BROWN.